United States Patent [19]

Löffler et al.

[11] Patent Number: 5,069,111
[45] Date of Patent: Dec. 3, 1991

[54] HYDRAULIC PRESSURE-CONTROL DEVICE WITH PARALLEL COMPRESSION SPRINGS

[75] Inventors: Alfons Löffler, Friedrichshafen, Fed. Rep. of Germany; Walter Marte, Oberteuringen, Austria; Peter Wiggermann, Oberdorf, Fed. Rep. of Germany

[73] Assignee: Zahnradfabrik Friedrichshafen AG, Fed. Rep. of Germany

[21] Appl. No.: 423,395

[22] PCT Filed: Mar. 26, 1988

[86] PCT No.: PCT/EP88/00254
§ 371 Date: Oct. 3, 1989
§ 102(e) Date: Oct. 3, 1989

[87] PCT Pub. No.: WO88/08086
PCT Pub. Date: Oct. 20, 1988

[30] Foreign Application Priority Data
Apr. 4, 1987 [DE] Fed. Rep. of Germany ....... 3711492

[51] Int. Cl.⁵ .................. F15B 11/00; F16K 15/00
[52] U.S. Cl. ........................................ 91/516; 91/518; 91/528; 91/532; 137/529; 137/538
[58] Field of Search .............. 137/494, 529, 538; 91/516, 518, 528, 532

[56] References Cited

U.S. PATENT DOCUMENTS

| | | | |
|---|---|---|---|
| 1,308,165 | 7/1919 | Clark | 137/529 |
| 2,011,333 | 8/1935 | Clifton | 137/538 |
| 4,034,563 | 7/1977 | Orth | 60/422 |
| 4,541,451 | 9/1985 | Wittren et al. | 91/516 X |
| 4,556,078 | 12/1985 | Wittren | 91/516 X |
| 4,869,288 | 9/1989 | Toshio et al. | 137/494 |

FOREIGN PATENT DOCUMENTS

| | | | |
|---|---|---|---|
| 656963 | 1/1963 | Canada | 137/494 |
| 0090129 | 5/1983 | European Pat. Off. | |
| 2557585 | 6/1977 | Fed. Rep. of Germany | |
| 2950257 | 7/1980 | Fed. Rep. of Germany | 137/528 |
| 1449526 | 10/1965 | France | |
| 427204 | 12/1974 | U.S.S.R. | 137/529 |

Primary Examiner—Edward K. Look
Assistant Examiner—John Ryznic
Attorney, Agent, or Firm—Davis, Bujold & Streck

[57] ABSTRACT

A hydraulic pressure-control device, specially for powershift transmissions of motor vehicles, comprises a fluid pump (1) and a main valve for regulating the pressure in at least one high-pressure consumer device (6), which is attached to a pressure pipe (3) between the fluid pump (1) and the main pressure valve. The main pressure valve is designed as pressure-relief valve. In the main pressure valve is integrated the operation of a second pressure-relief valve. Two different pressure limits can be adjusted in the pressure pipe (3) by a valve piston (21) through two compression springs (17, 18) connected in parallel of which one compression spring (18) is bound.

5 Claims, 1 Drawing Sheet

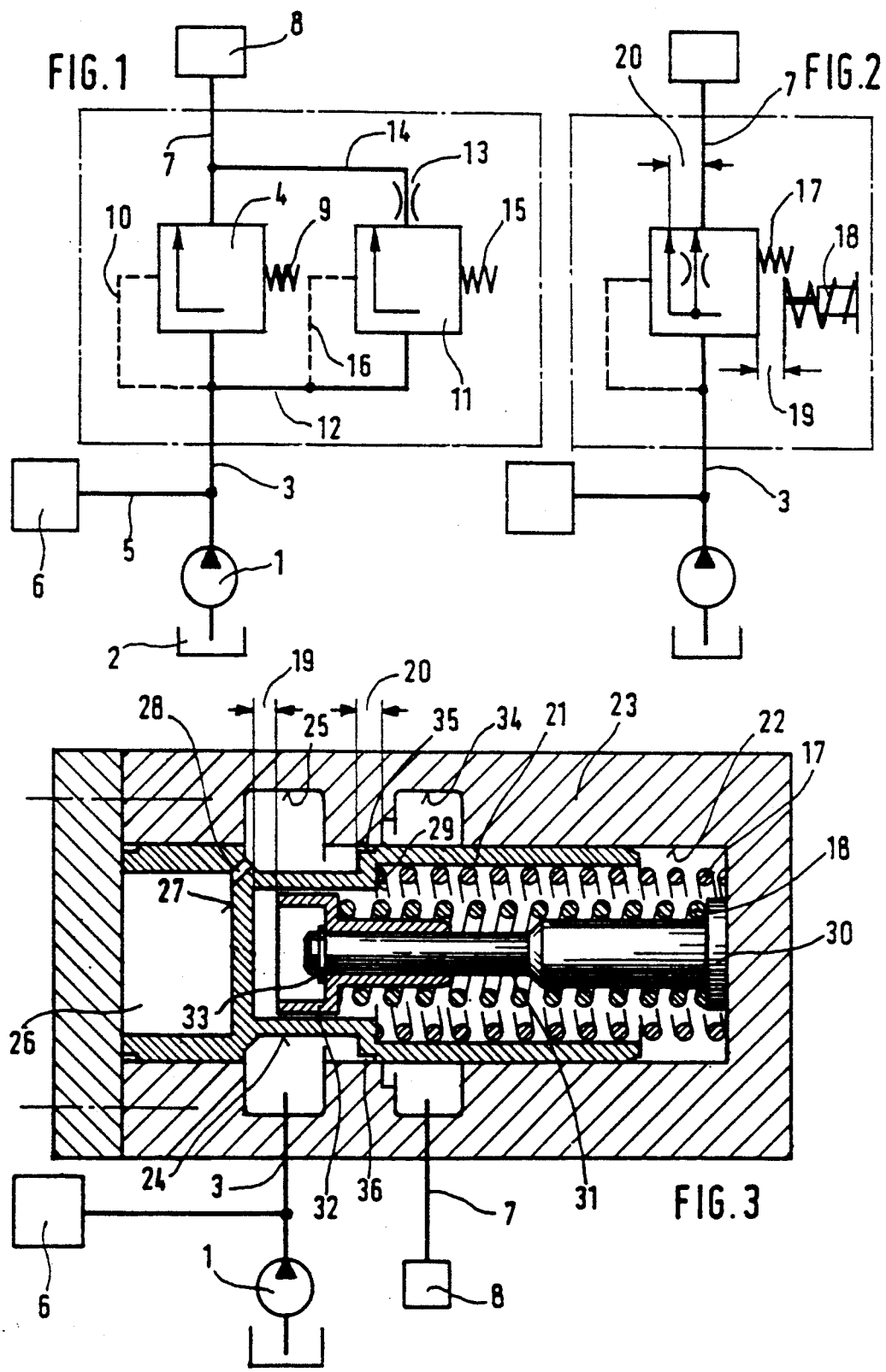

HYDRAULIC PRESSURE-CONTROL DEVICE WITH PARALLEL COMPRESSION SPRINGS

The invention concerns a hydraulic pressure-control device, specially for powershift transmissions of motor vehicles according to the preamble of claim 1.

Such a pressure-control device has been disclosed in German patent 25 57 585. In that pressure-control device a main pressure valve serves to produce a certain main pressure for actuating shift elements such as clutches and brakes. In the case of powershift transmissions the torque converter is bypassed by a lock-up clutch at high speeds. When the lock-up clutch is open, the main pressure is elevated in order that the higher torques effected by the torque converter during the gas give off can be transmitted by the clutches. If in this state of operation the speed of the pump is low—for example, when the vehicle is stationary and at low speeds of the vehicle and low speeds of the motor (idling speed)—then the leakages associated with the delivery rate of the pump are high. Thereby the low-pressure comsumer devices attached to the drain pipe of the main pressure valve such as the torque converter and a lubrication circuit attached thereto are supplied with a correspondingly smaller amount of fluid.

The problem to be solved by the invention is to improve the pressure-control device known already in the sense of reducing the leakages occurring in said state of operation at low driving speeds of the fluid pump.

This problem is solved by the hydraulic pressure-control device characterized in claim 1. Advantageous and convenient embodiments are given in the sub-claims. The invention is not limited to the combinations of features of the claims. Other important possible combinations result for the expert from the claims and individual features of the claims on the basis of the stated problem.

By the parallel connection of the second pressure-relief valve to the main pressure valve and by an added throttle site it is obtained that at low driving speeds and thus with a small fluid current, a relatively low working pressure be adjusted. Through the second pressure-relief valve, a sufficiently large current of fluid flows toward the lubrication circuit. The outcropping pressure on the shift elements is relatively low so that the leakages can likewise be kept small. The rear-mounted throttle site permits that, as the driving speeds of the fluid pump increase and the current of fluid thus becomes larger, the working pressure be adjusted also to a level required for actuating the shift elements.

In a convenient embodiment, due to the parallel connection of the compression springs of the main pressure valve and of the second pressure-relief valve in the corresponding state of operation, both compression springs act upon a valve piston which carries the functions of the main pressure valve and of the second pressure-relief valve. Therefore, the actual compression spring of the main pressure valve can be reduced.

The compression spring having the stronger initial stressing force is bound, that is, limited in its expansion. Thereby the common valve piston can regulate with uninterrupted transition two different heights of pressure. The parallel connection and encasing into each other of the two compression springs of the main pressure valve and of the second pressure-relief valve result in a simpler and space-saving construction of the pressure-control device.

The invention is explained in detail herebelow with reference to an embodiment shown in the drawing. In the drawing:

FIG. 1 is a fundamental illustration of the pressure-control device of the first embodiment with the shifting arrangement of the main pressure valve and of the second pressure-relief valve, FIG. 2 is a fundamental illustration of the pressure-control device of the second embodiment with the shifting arrangement of FIG. 1, but with the function of the second pressure-relief valve with the function of the second pressure-relief valve integrated in the main pressure valve, FIG. 3 is a constructional embodiment of the pressure-control device of FIG. 2.

The hydraulic pressure-control device of FIG. 1 contains a fluid pump which draws fluid from a tank 2 and conveys it into a pressure pipe 3. To the pressure pipe 3 is attached a main pressure valve 4. From the pressure pipe 3 branches off a main pressure pipe 5 which leads to a high-pressure consumer device 6. Said high-pressure consumer device consists, for example, of several shift elements designed as clutches and/or brakes of a powershift transmission of a motor vehicle. A drain pipe 7 leads from the main pressure valve 4 to a low-pressure consumer device 8 formed, for example, by a torque converter and a lubrication circuit, not shown, of the powershift transmission.

The main pressure valve 4 is designated as pressure-relief valve and is closed by a compression spring 9 and opened via a control pipe 10, by the pressure prevailing in the pressure pipe 3.

A second pressure-relief valve 11 is connected parallel with the main pressure valve 4. The inlet side of the second pressure-relief valve 11 is connected with the pressure pipe 3 by a branch pipe 12. The drain side of the second pressure-relief valve 11 is connected with the drain pipe 7 by way of a restriction 13 and a connecting pipe 14. With the main pressure valve 4, the second relief valve 11 is closed by a compression spring 15 and opened via a control pipe 16, by the pressure prevailing in the pressure pipe 3.

The spring tension of the compression spring 15 is less than the spring tension of the compression spring 9 so that the opening pressure of the second pressure-relief valve 11 is, for example, 8bar and the opening pressure of the main pressure valve 4 is, for example, 18 bar.

FIG. 2 shows a diagrammatic illustration of an embodiment of the hydraulic pressure-control device wherein the function of the second pressure-relief valve 11 is integrated in the main pressure valve 4. In this embodiment two compression springs 17 and 18 have been situated parallel with each other. The compression springs 17 and 18 have been situated parallel with each other. The compression spring 17 has been designated with a smaller compressive force than the compression spring 18. This case the compression spring 17 acts both for the lower and for the higher pressure range. The compression spring 18 having the greater compressive force is bound. This means that the expansion of the compression spring 18 is limited and only becomes active when the valve is adjusted to a certain valve path (movement) 19. The valve path 19 is here smaller than the adjusting path (movement) 20 of the valve until an unthrottled communication opens between the pressure pipe 3 and the drain pipe 7. The opening of said unthrottled communication corresponds to the opening of the main pressure valve 4 of the embodiment shown in FIG. 1.

FIG. 3 shows a constructional embodiment of the hydraulic pressure-control device wherein the function of the second pressure-relief valve is integrated in the main pressure valve. A valve piston 21 is movably situated in a valve bore 22 of a valve housing 23 and has a piston groove 24. Said piston groove 24 is in constant communication with the pressure pipe 3 via a housing annular groove 25 situated in the valve housing 23. A piston space 26 which is confined on its open side by the frontal side 27, shown left in FIG. 3, of the valve piston 21 is in constant communication with the piston groove 24 via a bore 28. The compression spring 17 is introduced under prestress between the frontal side 29, shown right in FIG. 3, of the valve piston 21 and the valve housing 23.

The compression spring 18 inserted with free axial movement is bound within the compression spring 17 in the valve bore 22 on the right side of the valve piston 21. The compression spring 18 is here supported on one side on a collar 30 of a piston 31. On the other side the compression spring 18 is supported on a bushing 32, which is movably situated on the piston 31 and has its movement limited by a stop disposed on the free end of the piston 31 in the form of a snap ring 33.

Next to the housing annular groove 25 is another housing annular groove 34 which is in constant communication with the drain pipe 7 leading to the low-pressure consumer device 8. On the valve piston 21 attached to the piston groove 24 is situated a throttle step 35 which, together with the valve bore 22, forms an annular gap 36. Said annular gap 36 constitutes the constructional design for the throttle site 13 of FIG. 1.

In the starting position of the valve piston 21, which is adjusted by the compression spring 17, the flow from the housing annular groove 25 to the housing annular groove 34 is blocked. Between the valve piston 21 and the bushing 32, there is in axial direction a spacing which corresponds to the valve path 19. The spacing between the left control edge of the housing annular groove 34 and the left control edge of the throttle step 35 corresponds to the valve path 20 of FIG. 2.

Herebelow is described the operation of the hydraulic pressure-control device with reference to the embodiment of FIG. 3 combined with FIG. 1. If the fluid pump 1 is driven at a relatively low speed, for example, the idling speed of a vehicle engine, then the pressure that generates in the pressure pipe 3 is limited by the second pressure-relief valve 11 to a certain low value such as 8 bar. The second pressure-relief valve 11 is formed here by the valve piston 21 with the throttle step 35 combined with the valve bore 22, the housing annular groove 34 and the compression spring 17. When this lower pressure limit is reached in the pressure pipe 3, then the valve piston 21 is moved to the right against the tension of the compression spring 17 by the pressure acting on the left frontal surface 27 until the throttle step 35 reaches the area of the housing annular groove 34. Thereby results an open throttle site in the form of the annular gap 36, that is, the second pressure-relief valve 11 of FIG. 1 is opened.

As the driving speed of the fluid pump 1 increases, the pressure in the pipe 3 rises due to the throttle effect of the annular gap 36. The valve piston 21 is moved further to the right until it abuts on the bushing 32. At this point of adjustment of the valve piston 21 reached after surmounting the valve path 19, the compression spring 18 starts to act upon the valve piston 21 and determines the upper limit of the working pressure in combination with the compression spring 17. If the upper limit of the working pressure such as 18 bar is exceeded, then the valve piston 21 is moved further to the right against the tension of both compression springs 17 and 18 until there is opened an unthrottled flow from the housing annular groove 25 via the piston groove 24 to the housing annular groove 34. This unthrottled flow duct constitutes the open passage duct of the main pressure valve.

The combination of the main pressure valve and the second pressure-relief valve makes possible a lowering of pressure at idle speeds of the fluid pump 1 to reduce the leakages in the clutches or brakes of the high-pressure consumer device 6. Thereby results in addition a reduction of the frictional losses and power transmission losses, for example, on the piston rings of the high-pressure consumer device. Thereby it is also possible at low speeds to supply the low-pressure consumer device 8 with a larger amount of fluid.

REFERENCE NUMERALS

1—fluid pump
2—tank
3—pressure pipe
4—main pressure valve
5—main pressure pipe
6—high-pressure consumer device
7—drain pipe
8—low-pressure consumer device
9—compression spring
10—control pipe
11—second pressure-relief valve
12—branch pipe
13—throttle site
14—connecting pipe
15—compression spring
16—control pipe
17—compression spring
18—compression spring
19—valve path
20—adjustment path
21—valve piston
22—valve bore
23—valve housing
24—piston groove
25—housing annular groove
26—piston space
27—frontal side
28—bore
29—frontal side
30—collar
31—piston
32—bushing
33—snap ring
34—housing annular groove
35—throttle step
36—annular gap

We claim:

1. A hydraulic pressure-control device, for a power-shift transmission of a motor vehicle, comprising a fluid pump (1) being connected, via a pressure pipe (3), to a main pressure valve (4), for regulating the pressure in at least one high-pressure consumer device (6) connected to said pressure pipe (3), said main pressure valve (4) functioning as a pressure-relief valve and being biased into a closed position by a compression spring and being movable into an opened position by pressurized fluid of said pressure pipe (3), and said main pressure valve (4) being connected to a drain pipe (7) leading to at least one low-pressure consumer device (8), wherein said main pressure valve comprises a valve piston (21), movable in a valve bore (22) of a valve housing (23), for controlling throttled flow of pressurized fluid, through a throttle site, and unthrottled flow of pressurized fluid from said pressure pipe (3) to said drain pipe (7), said valve piston (21) is biased into a closed position by two compression springs (17, 18) connected in parallel with one another, one of said compression springs (18) is bound while the other of said compression springs (17) is unbound, during the throttled flow of pressurized fluid the bound compression spring (17) is at least partially compressed and during the unthrottled flow of pressurized fluid both compression springs (17, 18) are at least partially compressed, and the movement (19) of said valve piston (21) required in moving from its initial position until an initiation of compression of the bound compression spring (18) is smaller than the movement (20) of said valve piston (21) required to allow the unthrottled flow of pressurized fluid from said pressure pipe (3) to said drain pipe (7).

2. A pressure-control device according to claim 1, wherein said bound compression spring (18) is supported on an elongate piston (31) and is clamped between a collar (30) supported at one end of said piston (31) and a movable bushing (32) supported adjacent a second end of said piston (31), and movement of said bushing (32) in a direction away from said collar (30) is limited by a stop member (33) located at the second end of said piston (31).

3. A pressure-control device according to claim 2, wherein said throttle site comprises a throttle step (34) on said valve piston (21), and said throttle step together with said valve bore (22) form an annular gap (36) therebetween for allowing throttled flow.

4. A pressure-control device according to claim 1, wherein said bound compression spring (18) has a greater compressive force than said unbound compression spring (17).

5. A pressure-control device according to claim 1, wherein said valve piston (21) is biased into its initial position by only said unbound compression spring (17), having a smaller compressive force than said bound spring (18), and when the valve piston (21) is in its initial position the flow of pressurized fluid from said pressure pipe (3) to said drain pipe (7) is prevented, and said valve piston (21), upon movement from its initial position toward said bound and unbound compression springs (17, 18), first compresses said unbound compression spring (17) and opens the throttled flow of pressurized fluid through said throttle site and thereafter, upon further movement of said valve piston (21) toward said compression springs, commences compression of said bound compression spring (18) to allow the unthrottled flow of pressurized fluid from said pressure pipe (3) to said drain pipe (7).

* * * * *